Nov. 30, 1954     R. I. ROTH     2,695,668
FILM FEEDING, FRAME COUNTING, AND PERFORATING DEVICE
Filed April 21, 1950     11 Sheets-Sheet 1
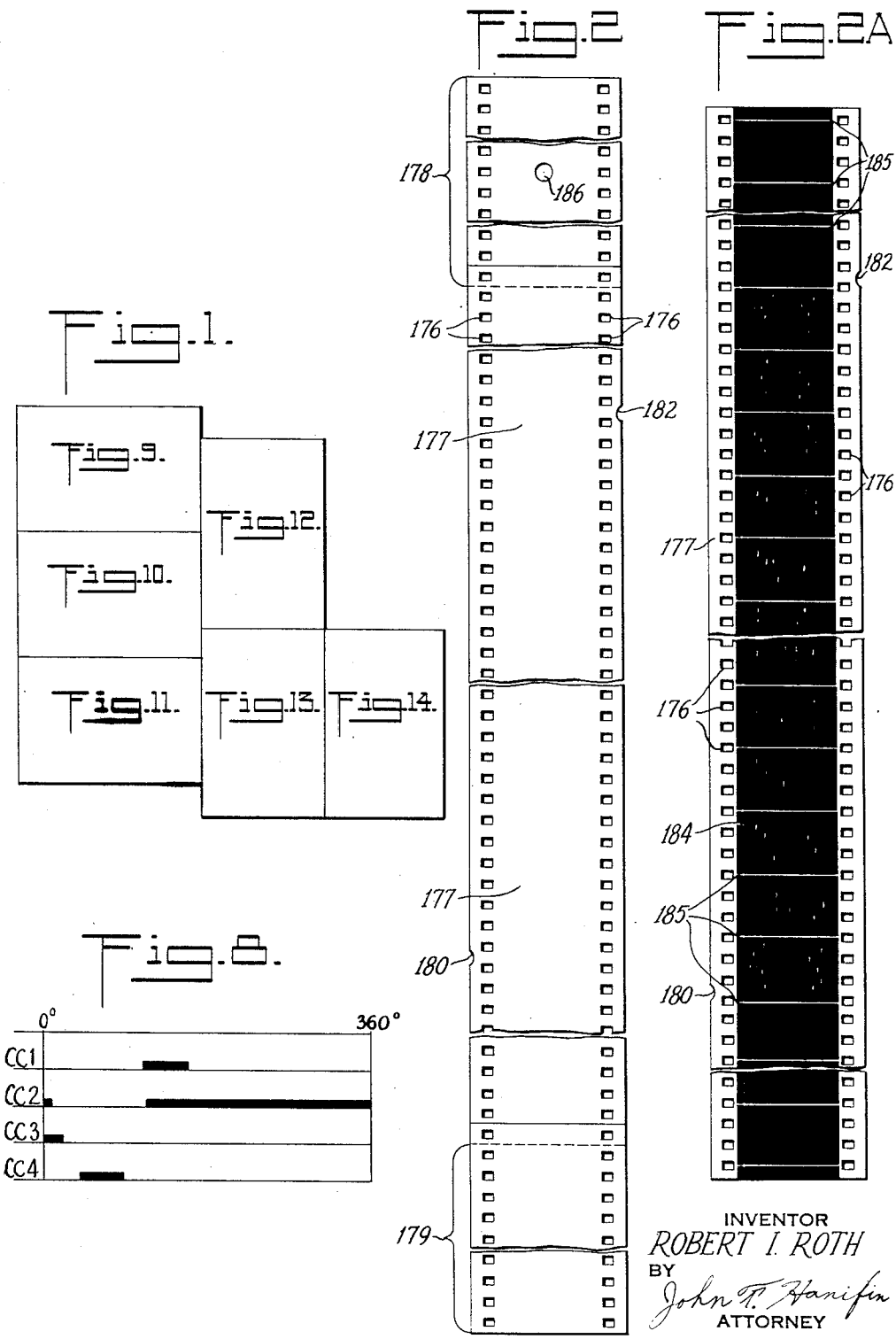
INVENTOR
ROBERT I. ROTH
BY
John T. Hanifin
ATTORNEY Nov. 30, 1954  R. I. ROTH  2,695,668
FILM FEEDING, FRAME COUNTING, AND PERFORATING DEVICE
Filed April 21, 1950  11 Sheets-Sheet 2
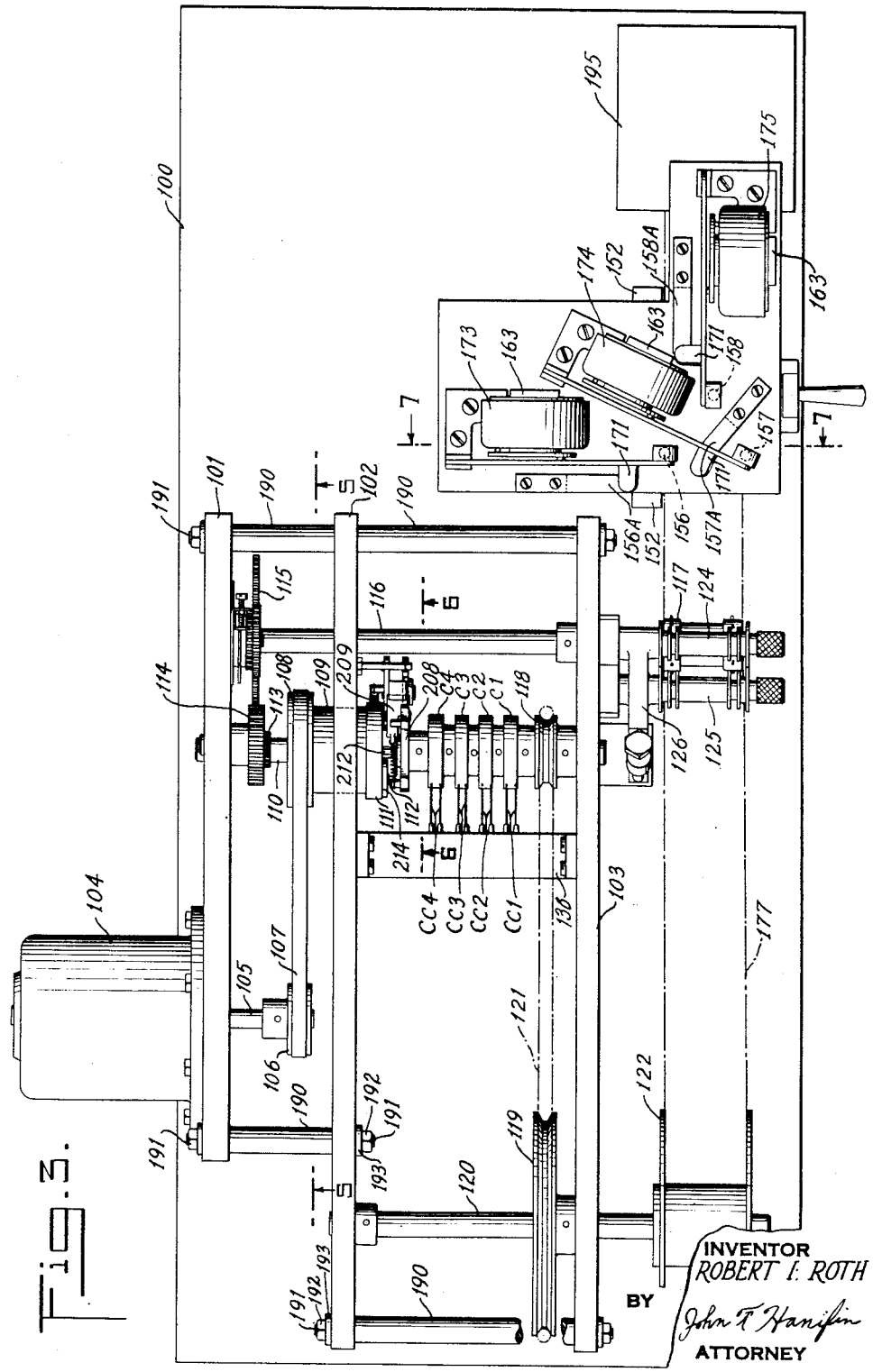

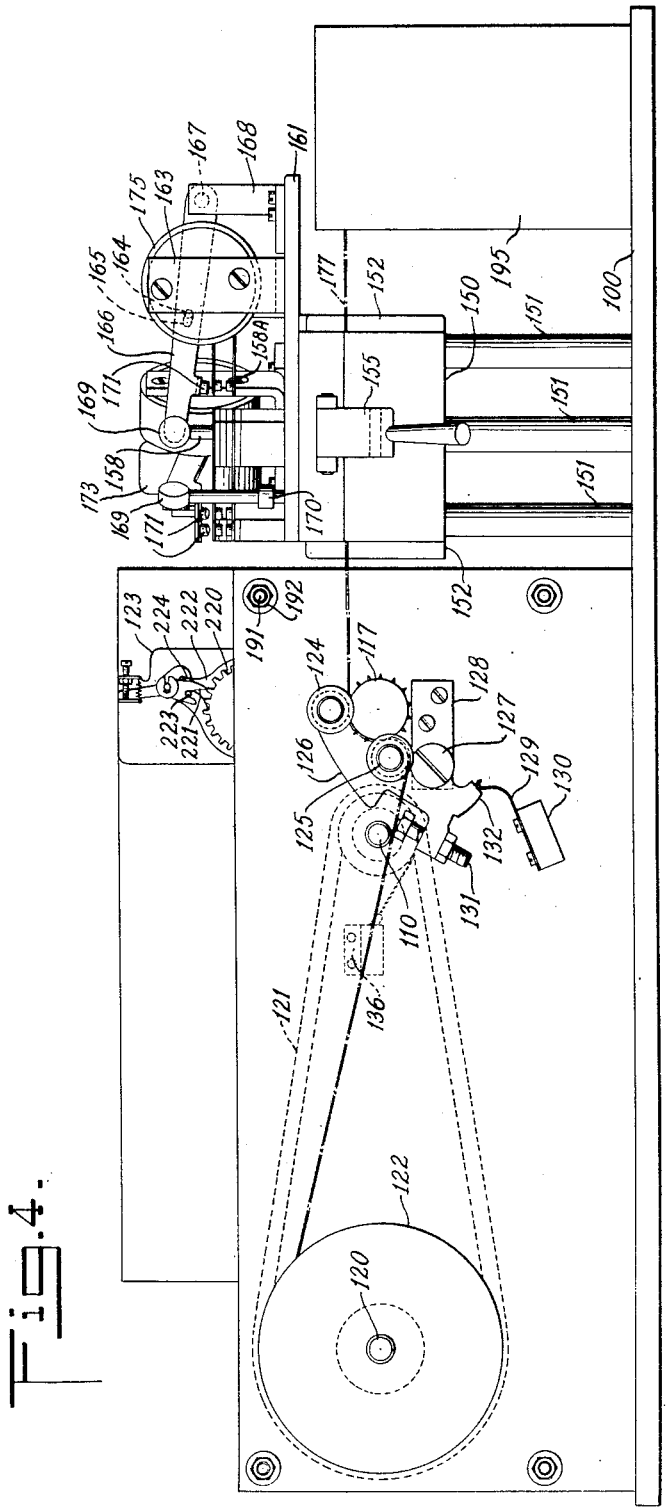

Nov. 30, 1954   R. I. ROTH   2,695,668
FILM FEEDING, FRAME COUNTING, AND PERFORATING DEVICE
Filed April 21, 1950   11 Sheets-Sheet 4

INVENTOR
ROBERT I. ROTH
BY
John F. Hanifin
ATTORNEY

Nov. 30, 1954     R. I. ROTH     2,695,668
FILM FEEDING, FRAME COUNTING, AND PERFORATING DEVICE
Filed April 21, 1950     11 Sheets-Sheet 5

INVENTOR
ROBERT I. ROTH
BY
John F. Hanifin
ATTORNEY

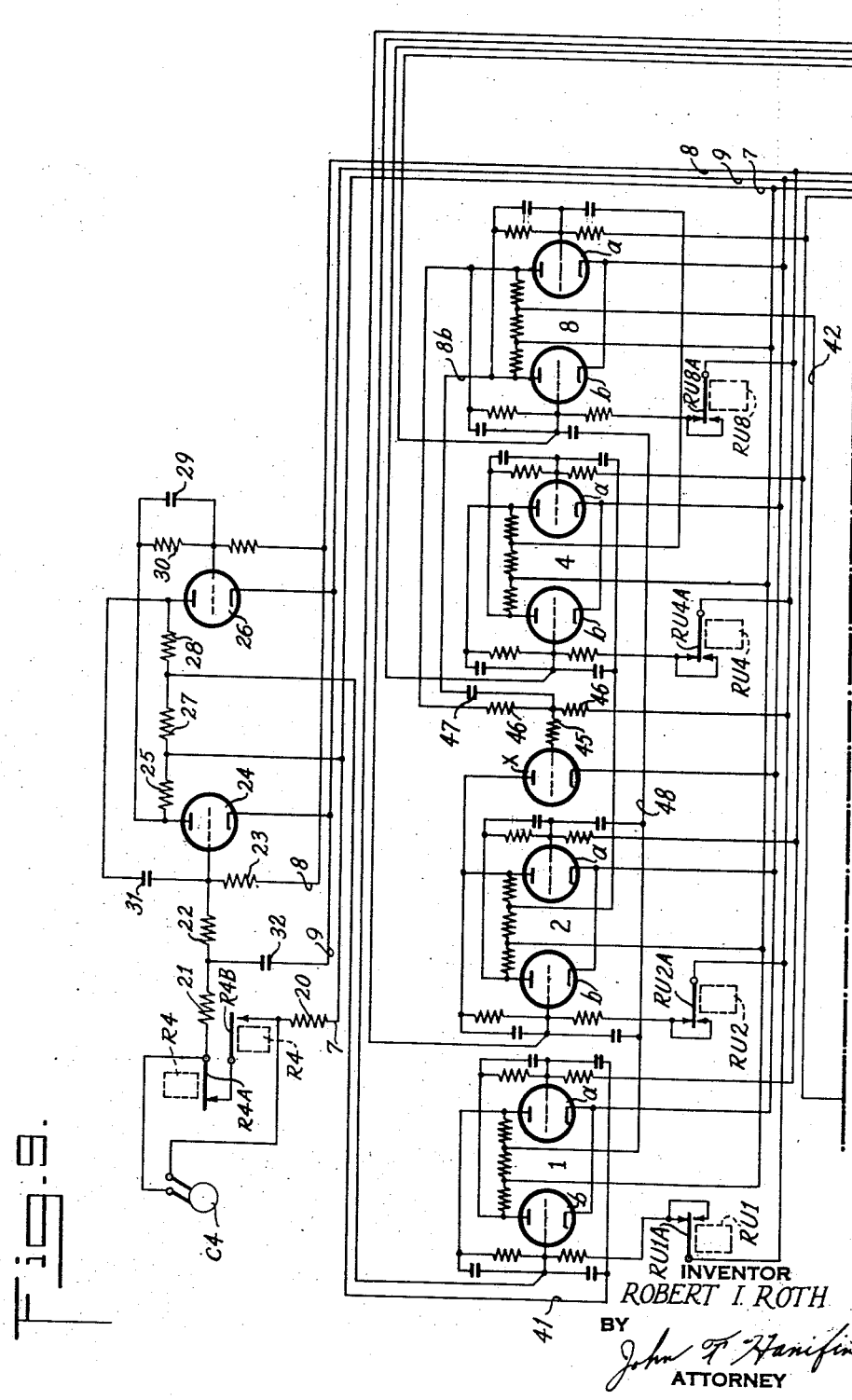

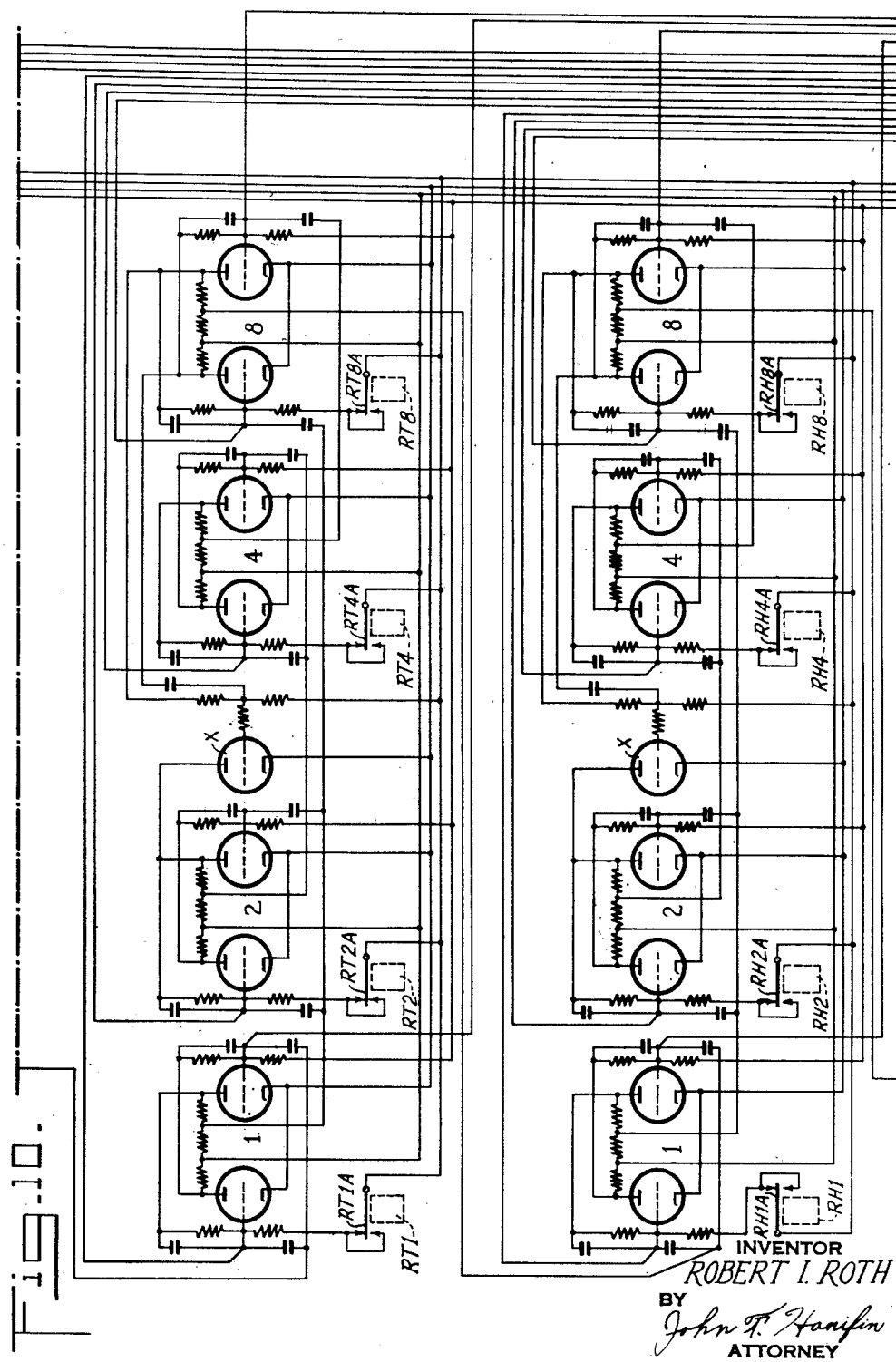

Nov. 30, 1954      R. I. ROTH      2,695,668
FILM FEEDING, FRAME COUNTING, AND PERFORATING DEVICE
Filed April 21, 1950      11 Sheets-Sheet 8
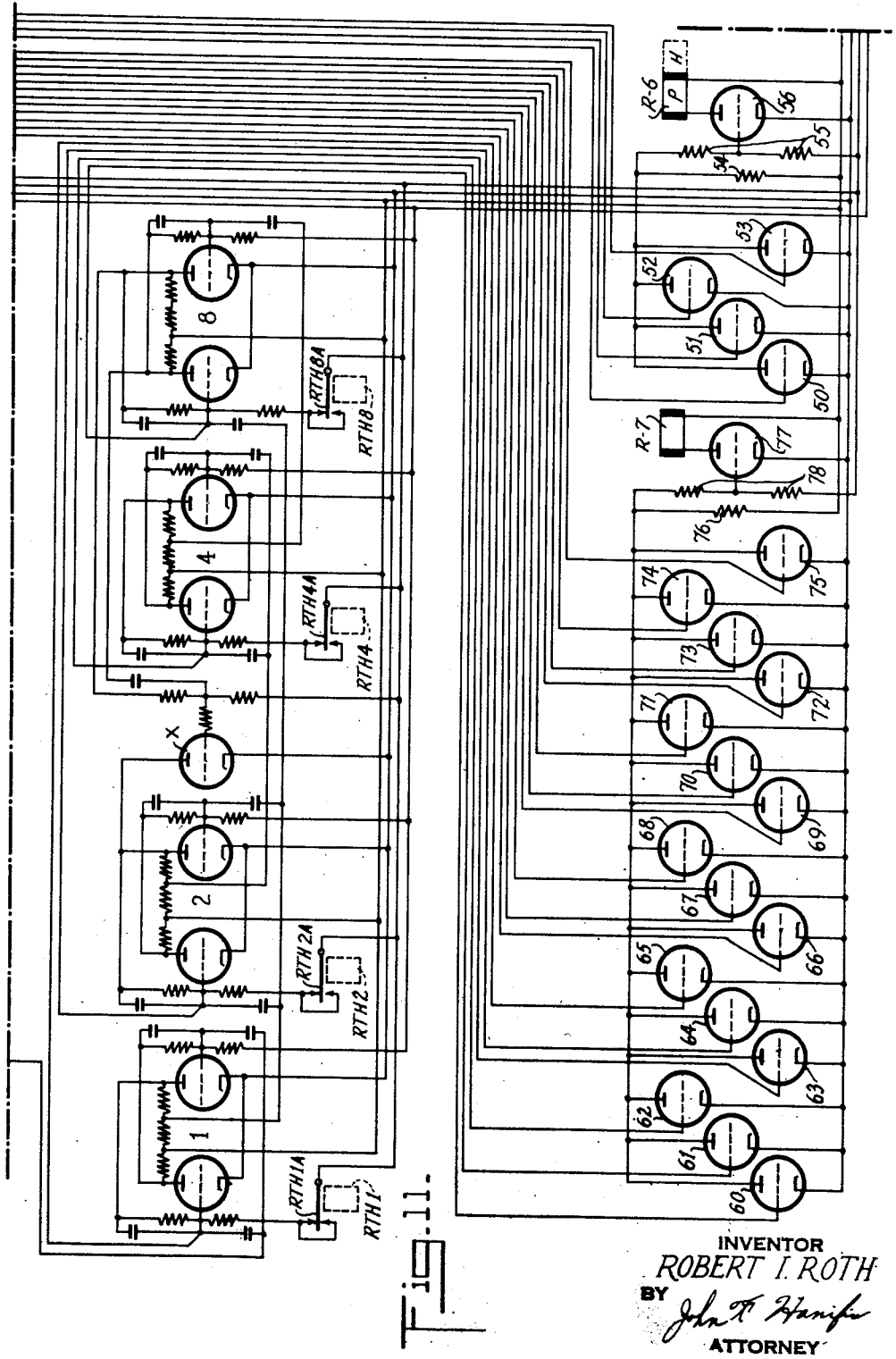
INVENTOR
*ROBERT I. ROTH*
BY
ATTORNEY

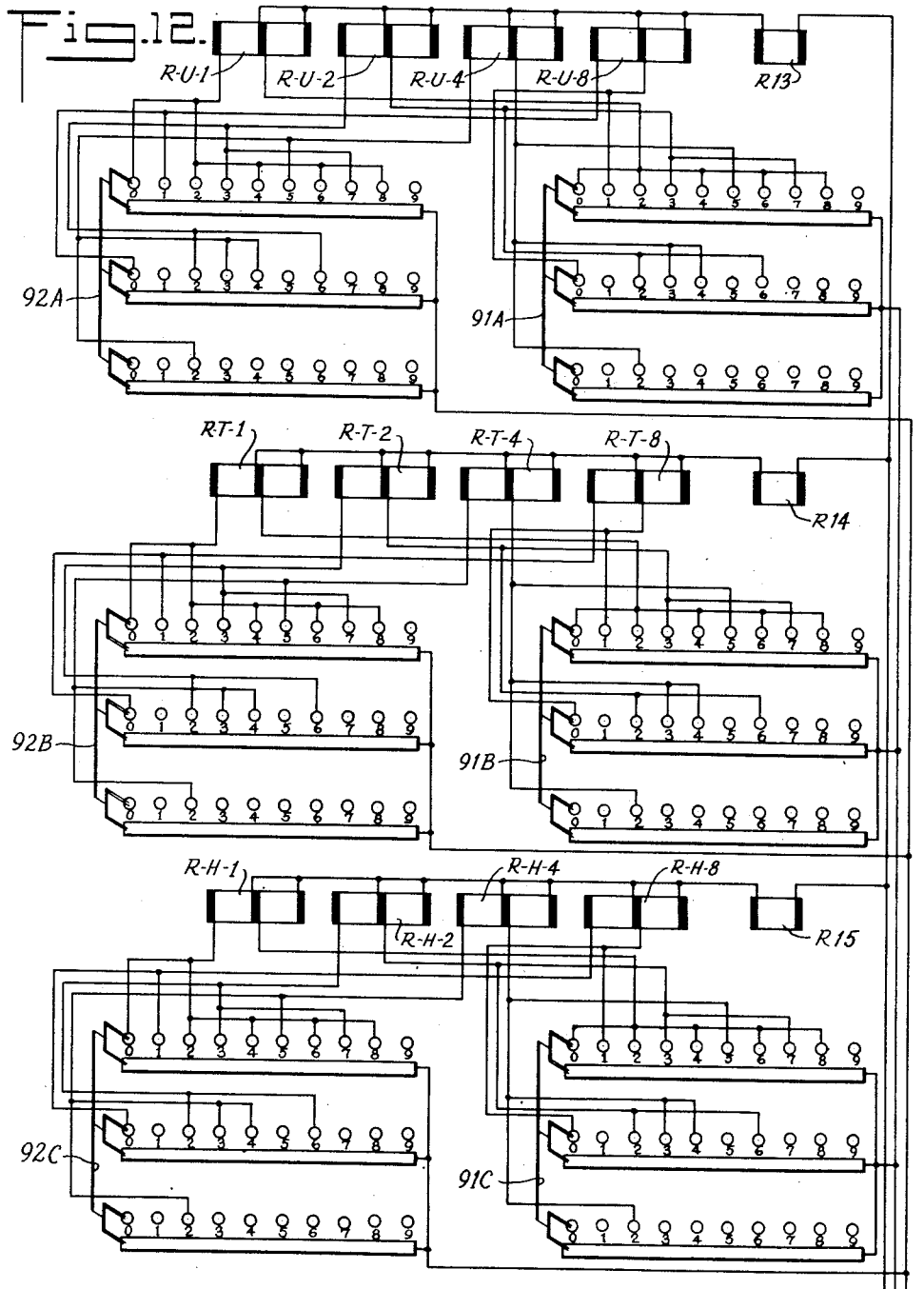

Nov. 30, 1954     R. I. ROTH     2,695,668
FILM FEEDING, FRAME COUNTING, AND PERFORATING DEVICE
Filed April 21, 1950     11 Sheets-Sheet 10
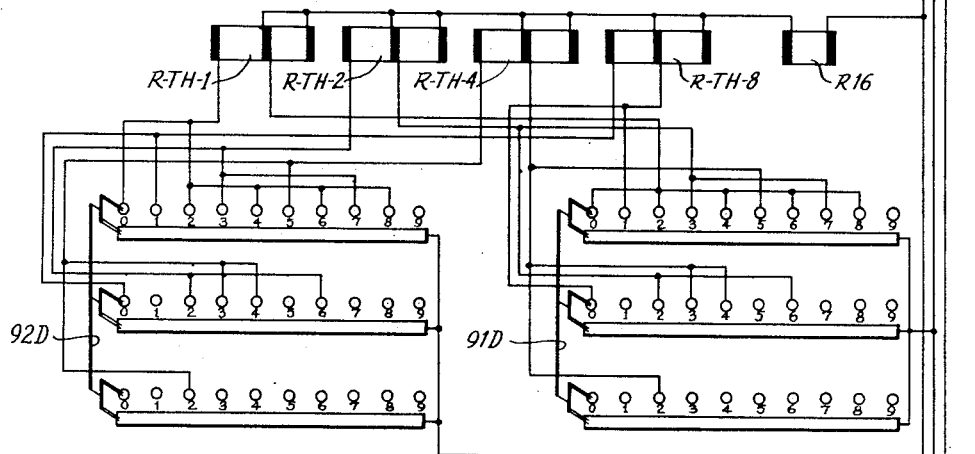
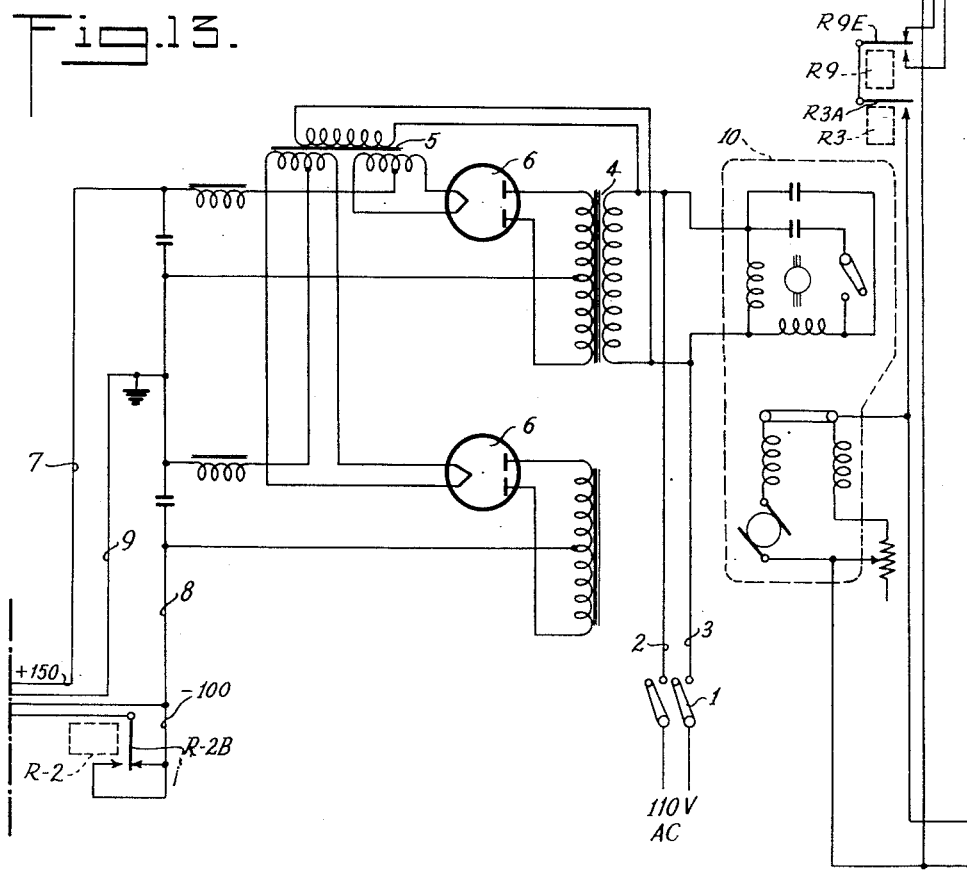
Fig.13.
INVENTOR
ROBERT I. ROTH
BY
John T. Hanifin
ATTORNEY

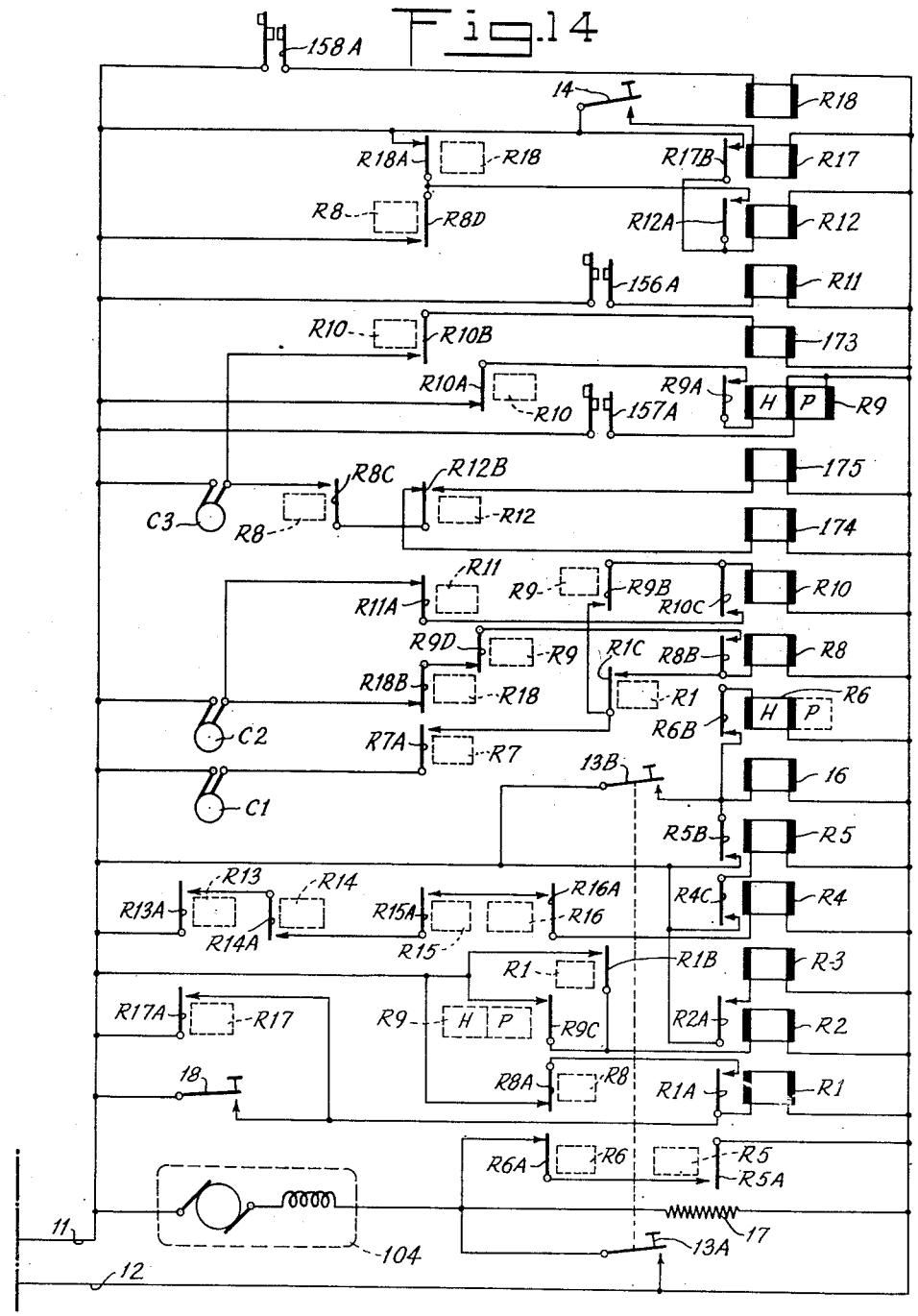

United States Patent Office 2,695,668
Patented Nov. 30, 1954

2,695,668

FILM FEEDING, FRAME COUNTING, AND PERFORATING DEVICE

Robert I. Roth, Briarcliff Manor, N. Y., assignor to International Business Machines Corporation, New York, N. Y., a corporation of New York Application April 21, 1950, Serial No. 157,348

4 Claims. (Cl. 164—89)

This invention relates to mechanisms for preparing film for use in card to film and film to card machines, and more particularly to mechanisms for forming notches and perforations in film to control the operations of such machines.

In transferring data from perforated cards to film or from film to cards, it is necessary that the film and cards be fed in synchronism and that mechanisms operate at the proper time for transferring data from one to the other. By providing a perforation in the film to locate it with respect to feeding means, and providing notches in the film to effect starting and stopping operations, it is possible to obtain an accurate transfer of data.

It is, therefore, an object of this invention to provide an improved means for preparing film for use in a card to film machine.

Another object of the invention is to provide an improved means for punching control notches and a threading hole in a film to be used in a card to film machine.

Still another object of the invention is to provide an improved means for measuring lengths of tape material and for perforating the material at the end of the measured length.

Yet another object of the invention is to provide an improved electronic means for measuring lengths of material.

Another object of the invention is to provide automatic means for counting the number of "frames" on an area of film.

Another object of the invention is to provide means for automatically producing upon a film, notches which can be used for control purposes in a card to film machine.

Still another object of the invention is to provide means for producing upon a film a threading hole which can be used to accurately position the film in a card to film machine.

Further and other objects and advantages will be apparent from the specification and claims, and from the accompanying drawings which illustrate what is now considered to be a preferred embodiment of the invention.

In the drawings:

Fig. 1 illustrates the relationship in which Figs. 9, 10, 11, 12, 13, and 14 are connected;

Fig. 2 shows portions of a raw film prepared for photographing;

Fig. 2A shows a portion of a developed film, each black rectangle with its transparent spots corresponding to a particular tabulating card with its perforations;

Fig. 3 is a plan view of the mechanism for preparing the film;

Fig. 4 is a side elevational view of the mechanism shown in Fig. 3;

Fig. 7 is an enelarged vertical sectional view taken on the plane of the line 7—7 of Fig. 3 and showing the punching mechanism;

Fig. 8 is a timing chart of certain contacts in the device;

Figure 5:
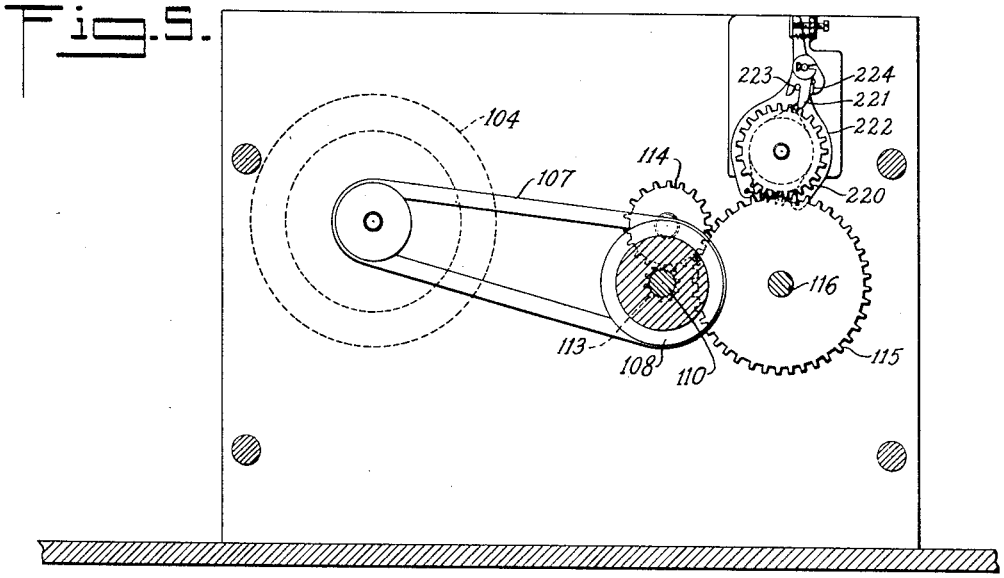
Fig. 5 is a vertical sectional view taken on the plane of the line 5—5 of Fig. 3 showing, in more detail, an anti-back-up device.

Figs. 9 to 14, taken together, show the circuit diagram of the electrical and electronic components of the machine.

Fig. 15 shows the arrangement of the control panel.

Reference should be made to the application of Robert I. Roth, Serial Number 88,452, filed April 19, 1949, for an illustration of a card to film-film to card machine, hereafter referred to as the machine, which will utilize the present invention. Such a machine is used where it is desirable to obtain a record of data punched in tabulating cards for storage in very compact form. Punched cards can be sensed, and the sensed data reproduced in compact form on photographic film. Thereafter, it may be desired to reproduce a new set of tabulating cards from the film. As an incident to the foregoing general operations, it may be desired to check the accuracy of the film by comparing the film data against the punched data appearing on the original tabulating cards.

For "card to film" operations, the cards are sensed by brushes in the reproducer section of the machine, while unexposed film is being simultaneously fed in the camera section of the machine. Normally open shutter devices are provided which allow light to reach the film. When a perforation is sensed in a card, the corresponding shutter is called into operation so light is prevented from reaching the film. In this way, upon development the film will show a transparent area at points (see Fig. 2A) which correspond to the sensed perforations on the card, with the remaining area in the related column opaque.

For "film to card" operations, the developed film with its transparent spots or areas is fed through the camera section of the machine. In this case, the film acts as a shutter and allows or shuts off the passage of light from a light source to photocells. The photocells when activated call into operation related punch magnets which are in the reproducer unit, causing punching of a card. Accordingly, data on the film is converted into punched data on a card.

The machine also has provision for comparing a film with a set of cards which should exactly correspond. If a lack of correspondence is detected between a particular film frame and its related card, suitable controls are provided to stop machine operations and to designate the column where there is a discrepancy.

Obviously the film will have many requirements and limitations and it must be capable of being accurately threaded in the machine for proper operation. A length of film 177, prepared for photographing and provided with holes 176 for sprocket teeth, is shown in Fig. 1. For use, the film is wound on a reel and is provided with a leader 178 on its leading end and a trailer 179 on its trailing end. The leader and trailer must be black and of a length capable of circumferentially covering the outside of the reel in order to prevent light from reaching the raw film, if the camera is to be loaded or unloaded in daylight.

To place the film 177 on its reel, the end of trailer 179 is inserted in a slot in the core of the take-up spool 122 (Fig. 3) and the film is then wound with the emulsion side of the film towards the center.

Two control notches, a "start" notch 182 which will initiate the feed of cards in the machine and a "stop" notch 180 to terminate the feeding of cards, are punched in the edge of the raw film. The start notch is cut about three feet from the leading end and the stop notch about three feet from the trailing end of the raw film, and both must be placed in a fixed relationship to what will eventually be film frames 184, each frame being a portion of the film on which the data of a single card is recorded. The three foot lengths on each end are necessary for threading the developed film in film to card operations. The frame lines 185 or the intervals between frames are in line with the sprocket holes 176. The start notch is located between the sprocket holes just ahead of the first frame, and the stop notch is located between the sprocket holes toward the end of the last frame. Inasmuch as the film frames occupy a distance of three sprocket holes, the start notch will be a multiple of three sprocket holes from the stop notch. A counting device is provided to keep track of the equivalent number of frames so that these control notches are automatically placed in the proper positions.

In addition, a "threading hole" 186 must be placed in the leader so that the raw film will be properly inserted in the machine. The threading hole is on a frame line so the distance between the threading hole and the start notch is a multiple of the distance between three sprocket holes minus one-half the distance between any two sprocket holes. For example, two film frames occupy a distance of six sprocket holes, and if the threading hole should be placed that close to the start notch, the distance would be five and one-half sprocket holes or, since the sprocket holes are on 3/16 inch centers, 1 and 1/32 inches. This odd displacement of the threading hole with respect to the start notch is taken care of by positioning the respective punches.

It is the mechanism for forming the start notch 182, the stop notch 189, and the threading hole 186 that constitutes the invention to be described herein. This mechanism includes means for feeding film past punches which are operated automatically in accordance with the setting of manually operated switches.

*Film feeding mechanism*

Figure 6:
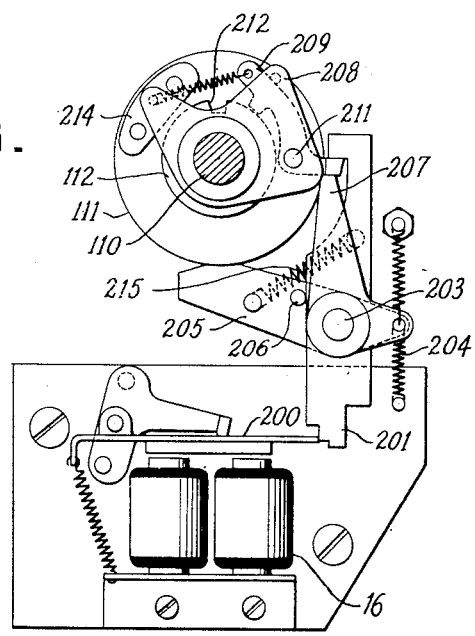
Fig. 6 is an enlarged vertical sectional view taken on the plane of the line 6—6 of Fig. 3 and showing in detail the structure of the single revolution clutch.

A device for feeding the film is mounted on a base plate 100 (Figs. 3 and 4) and includes a film sprocket 117 and a takeup spool 122 supported by three plates 101, 102, and 103 which are rigidly fastened to the base plate 100 and suitably located with respect to each other by spacers 190 and threaded rods 191 which have nuts 192 and washers 193 at their ends. A motor 104 is fastened to the rear of plate 101, and its shaft 105 extends through an opening in the plate. A pulley 106 is fastened to the motor shaft 105 and drives a belt 107 which in turn drives a pulley 108 fastened to a sleeve 109. Sleeve 109 is free to rotate on a shaft 110 and extends through a clearance hole in the plate 102. Fastened to the sleeve at its forward end is a disc 111 and a single notched driving element 112 (see Fig. 6). Energization of a clutch magnet 16 drops an armature 200 to a position below a latch arm 201 allowing it to move in a clockwise direction about a shaft 203. The clockwise force is imparted by a spring 204 acting through a knockoff arm 205 to force a pin 206 against both the latch arm 201 and a keeper 207. As the latch arm moves clockwise it released a clutch pawl 209 which rotates in a counterclockwise direction about a pivot 211 and rests against the single notched driving element 112. As the driving element 112 turns, the pawl 209 drops into a notch 212 in the element and turns with the latter. The pawl 209 is pivoted on a member 208 attached to the shaft 110 so that the shaft is driven when the clutch is engaged by an energizing of the clutch magnet 16. Means are provided for disengaging the clutch when the magnet is deenergized and the shaft 110 has been driven one revolution. This disengaging means comprises a restoring cam 214 which operates against the knockoff arm 205 and imparts counterclockwise motion to it. A spring 215 is connected between the arm 205 and the latch arm 201 for swinging the latter to its latching position when the arm 205 is rocked by the restoring cam. If the magnet 16 is deenergized at this time, the armature 200 operates to engage the latch for holding it in latching position. As the shaft 110 completes one rotation, the pawl 209 is engaged by the latch arm 201 causing it to rotate about the pivot 211 and thus be removed from notch 212.

The shaft 110 is journaled in the plates 101 and 103 and has fastened to it near the rear a pinion 113. Pinion 113 drives, through an idler gear 114 (Fig. 5), a gear 115 which is fastened to a shaft 116. This gearing is such that the shaft 116 is driven one revolution for five revolutions of the shaft 110. Shaft 116 is journaled in the plates 101 and 103 and has fastened to it at its forward end the sprocket 117. Sprocket 117 has 15 teeth and, as the ratio between shaft 110 and shaft 116 is five to one, one revolution of shaft 110 will turn shaft 116 one-fifth of a revolution and cause sprocket 117 to rotate a distance of three teeth. The distance covered by three sprocket holes on the film is equivalent to one film frame so that each revolution of the shaft 110 will cause the film to be fed one frame.

Mounted upon the shaft 110 for rotation therewith are four commutators C1, C2, C3, and C4. Contacts CC1, CC2, CC3, and CC4 are mounted upon a support 136 attached to the plates 102, 103 and coact with the corresponding numbered commutators. The purpose of the commutators will be explained in connection with the description of the wiring diagram.

Fastened to the shaft 110 near its forward end is a pulley 118 which drives through a spring belt 121 a pulley 119 which is fastened to a shaft 120 journaled in the plates 102 and 103 and carrying the take-up film spool 122. The ratio between the pulleys 118 and 119 is such as to tend to overdrive the shaft 120, thus keeping the film tightly wound on the spool 122. The spring belt 121 slips, and there is more tension in the bottom span of the belt than there is in the top span of the belt since the shaft 110 is driven in a counterclockwise direction, as viewed in Fig. 4. This unequal tension in the spring belt tends to urge shaft 110 in a clockwise direction when the clutch mechanism is disengaged. Such clockwise rotation is prevented by an antiback-up device (see Fig. 5), which comprises a gear 220 meshing with the gear 115 and carrying a ratchet with which a stop pawl 221 cooperates. A scissors assembly 222 is provided with a pin 223 and a finger 224 coacting with the stop pawl for positioning the latter relative to the ratchet. During rotation of the shaft 110 in a counterclockwise direction, the gear 220 is rotated in a clockwise direction. The scissors assembly frictionally engages a hub portion of the gear and turns slightly with the latter to move the pin 223 and the finger 224 so as to disengage the stop pawl 221 from the ratchet. At the moment a counterclockwise rotation of the gear 220 starts, the scissors assembly moves to the left and, through the pin 223 and the finger 224, forces the pawl 221 into the teeth of the ratchet wheel to effectively stop the rotation in that direction.

The film 177 is held on the sprocket 117 by two pressure rollers 124 and 125 which are rotatably mounted on pins supported by a lever 126. The forward ends of these pins are knurled and serve as knobs for swinging the pressure rollers manually away from the sprocket 117. The lever 126 is pivoted on a pivot screw 127 which is carried by a block 128 fastened to the plate 103. The pressure rollers are held against the sprocket by a flat spring 129 fastened to a block 130 attached to plate 103. The curved end of spring 129 bears against a tail portion of lever 126 and urges it in a clockwise direction, as viewed in Fig. 4. The lever 126 can be rotated in a counterclockwise direction by grasping the knurled knobs adjacent to the pressure rollers 124 and 125. Such counterclockwise motion can continue until a stop screw 131 abuts the block 130. When reaching this position, the curved end of the spring 129 bears against a curved portion 132 of lever 126 and holds the latter in its open position.

The supply reel and the film splicer, which may be any of the well-known types, are located to the right of the sprocket wheel and are represented by the block 195.

*Punching mechanism*

A punching mechanism is located between the film splicer and the sprocket assembly and includes a die block 150 which is supported from the base 100 by three legs 151. Two vertical bars 152 are fastened to opposite sides of the die block and serve as supports for a hinge pin 154 upon which is mounted a stripper 153. The stripper 153 is held down against the die block 150 by a latch 155 which cooperates with a suitable ledge 149 on the front of die block. The stripper 153 can be raised to an open position, to permit inserting the film, by lifting a handle 148 of the latch 155. From inspection of Fig. 7, it will be noted that a channel 147 is formed in the top of the die block and the bottom of the stripper for accommodating the film. The stripper 153 holds three punches; a start notch punch 156, a stop notch punch 157, and a threading hole punch 158. Each punch is equipped with a retracting spring 159 which acts against a cross pin 160 to hold the cross pin against the bottom of a plate 161 fastened to the top of the stripper 153, thus normally keeping the lower end of the punch above the surface of the film. The punches 156, 157, and 158 are operated by rotary solenoids 173, 174, and 175, respectively, each solenoid being held by a bracket 163 fastened to the plate 161. Inasmuch as the structures of all three punches and solenoids are similar, explanation of one will be sufficient. A driving pin 164 (Fig. 7) of the solenoid 173 engages a slot 165 in an arm 166 pivoted at one end by a pin 167 which is supported by a bracket 168. At its other end, arm 166 carries a roller 169 which rests on top of the punch. Energization of solenoid 173 causes the driving pin to rotate counterclockwise about the center of the solenoid thus causing the arm 166 to rotate counterclockwise about its pivot pin and force the punch 156 through the film. A collar 170 acts as a stop and limits the travel of the punch. A button 171, made of insulating material, is fastened to a bent over lug of the arm 166 and, when the punch has been driven through the film, this button is operable to close the contacts 156A associated with the solenoid 174. The purpose of these contacts will be explained in connection with the wiring diagram. Contacts 157A and 158A are associated with the solenoids 174 and 175, respectively, and are closed in a similar manner upon the energizing of the solenoids for actuating the punches 157 and 158.

*Circuit description*

The contacts controlled by the mechanism comprise those of the commutators, C1, C2, C3, and C4 which operate under control of the film clutch, and contacts 156A, 157A, and 158A operated by the punch solenoids. The latter are normally open, and close, as explained above, only when their associated solenoids are energized.

Referring to the composite circuit diagram, the closure of a switch 1 (Fig. 13) applies 110 volts A. C. to lines 2 and 3 which supply power to transformers 4 and 5. These transformers in conjunction with two rectifier tubes 6 comprise a power supply which delivers D. C. at a potential of plus 150 volts on a line 7, and a potential of minus 100 volts on a line 8, both with respect to a ground line 9. The A. C. lines 2 and 3 also supply a driving motor 10 of a motor generator which, when it is up to speed, provides D. C. control potential on lines 11 and 12.

The motor 104 is normally connected, as shown in Fig. 14, in series with a resistance 17 across the lines 11 and 12. An advance button 13 (Fig. 15) operates a contactor 13A (Fig. 14) adapted to short out the resistance 17 for effecting operation of the motor at top speed, and a contactor 13B adapted to complete a circuit through the clutch magnet 16 for effecting engagement of the clutch to advance the film.

Before actuating the button 13, the end of the trailer 179 on the raw film is attached to the hub of the take-up reel 122 and the film is threaded around the sprocket 117 so that it extends beneath the punches. The button is then actuated to close the contacts 13A for shorting the resistance 17 and causing the motor 104 to operate at high speed. The contacts 13B close at the same time for energizing the clutch magnet 16 to effect an advancing of the film. As the splice between the trailer and the raw film is about to pass under the punches 156, 157, the advance button is released causing the clutch to latch up and the motor to drop back to slow speed.

The notch button 18 is next depressed energizing relay R1 which holds through its R1A points and the normally closed R8A points. The R1B points close to complete a circuit through relay coil R2, the canceling relay. Relay points R2B (Fig. 13) are of the transfer type which break momentarily to interrupt a normal minus 100 volt bias on the right-hand tubes of all the tube trigger circuits and effect a resetting of the electronic counters to zero. Energizing of relay R2 also effects a closing of contacts R2A (Fig. 14) to energize relay R3. This causes a closing of the R3A points (Fig. 13) to complete circuits through nontransferred R9E points, and the leader set-up switches 91A, 91B, 91C, and 91D to energize the RU (units), RT (tens), RH (hundreds), and the RTH (thousands) relays according to the number set up in the leader set-up switches. These switches are set up by manually adjustable knobs (Fig. 15) which have been indicated as units (U), tens (T), hundreds (H), and thousands (TH) in correspondence with the relays controlled by them. The setting of the switches determines the number of film frames that will be fed before one of the punches is operated.

The RU, RT, RH, and RTH relays are of the transfer type and have contacts that break momentarily upon the energizing or deenergizing of the relays. Each relay has a set of A contacts in the grid return of the left-hand tube of each corresponding 1, 2, 4, and 8 trigger circuit. Therefore, as the relays are energized, the minus 100 volt bias is momentarily removed from the grid of the left-hand tube, causing that side of the trigger to conduct. Whenever the left-hand side of a trigger is conducting, the weighted value of that trigger is regarded as being entered in the counter. The set-up switches are wired in a 9's complement fashion so that when the RU, RT, RH, and RTH relays are energized the 9's complement of the number set up is entered in the counter.

As the RU, RT, and RH, and RTH relays pick up, the relays R13, R14, R15, (Fig. 12) and R16 (Fig. 13) are also energized, and the R13A, R14A, R15A, and R16A points (Fig. 14) in series operate to complete a circuit through a relay R4. Energization of the R4 relay coil causes the R4A points (Fig. 9) to open and the R4B points to close. They are adjusted so that the R4B points close slightly before the R4A points open, thus when relay R4 picks up, a momentary circuit is completed from the plus 150 volt line 7, through a resistor 20, R4B points, R4A points, resistor 21, resistor 22, resistor 23 to the minus 100 volt line 8. The resulting current flow through the path just traced causes the grid of the triode 24 to rise in potential with respect to the cathode so that the tube conducts current from line 7 through a resistor 25, the plate of triode 24, and the cathode of triode 24 to the line 9. Current flow through the resistor 25 causes the potential of the plate of triode 24 to fall with respect to the cathode and, as the plate of triode 24 is connected to the grid of a triode 26, the grid of triode 26 will become negative with respect to its cathode and triode 26 will cease to conduct. The junction point of resistors 27 and 28 will thus rise in potential. When the R4A points open, current ceases to flow through resistors 20, 21, 22, and 23, and the grid of triode 24 falls below cut-off. This causes the plate of triode 24 to rise in potential and, as it is connected to the grid of triode 26, triode 26 becomes conductive. The resulting current flow through resistors 27 and 28 causes the junction of resistors 27 and 28 to fall in potential thus sending a negative pulse to the electronic counter and causing the "elusive one" to be added into it. The number in the counter will now be the tens complement of the number set up in the set-up switches. The action of condenser 29 is to provide a momentary short circuit around resistor 30, and its purpose is to momentarily increase the value of the negative pulse on the grid of triode 26 at the time that triode 24 starts to conduct. The action of condenser 31 is to produce a positive pulse on the grid of triode 24 at the time that triode 26 goes to cut-off. This maintains triode 24 in a conducting state during the charging time of condenser 31. Condenser 32 is a filter condenser and it cooperates with resistors 21 and 22 to eliminate spurious pulses of short duration which might be caused by slightly imperfect contact of commutator C4 or relay points R4A and R4B.

Triodes 24, 26 and their associated resistors and condensers comprise a form of self-restoring trigger circuit, and in its normal status, triode 24 is at cut-off and triode 26 is conducting. The status of the triodes is reversed when a positive pulse is applied to the grid of triode 24, which then conducts and triode 26 goes to cut-off. When triode 26 goes to cut-off the potential of the junction point of resistors 27 and 28 rises, thus sending a positive pulse to the electronic counter. This positive pulse is, however, ineffective as the counter responds only to negative pulses. When the positive pulse is removed from the grid of triode 24, the before mentioned self-restoring trigger circuit goes back to normal status as soon as condenser 31 charges, and a negative pulse is sent to the electronic counter.

The electronic counter comprises four register orders designated units, tens, hundreds, and thousands. The register order operates to produce combinational patterns of electrical phenomena, each pattern corresponding to a different digit in the decimal notation. As the structure and operation of each is identical, an explanation of the units order only will be made. The order has four trigger stages 1, 2, 4, and 8, and a triode X. Triode X has its anode tied to the anode of tube (a) of stage 2. The grid of X is connected via a resistor 45 and the lower portion (as shown) of a voltage divider 46 to the line 8 so that tube X is normally nonconductive. The grid of X also is connected via resistor 45 and the upper portion (as shown) of divider 46 to the anode of tube (a) of stage 8 and connected via resistor 45 and a capacitor 47, approximately of 10 micromicrofarads, to a wire 8b extending to the anode of tube (b) of stage 8. The entry pulses are negative and fed via wire 41 to both impedance arms of stage 1 to reverse it from either status to the other. Each time stage 1 is tripped off, the negative pulse produced by its tube (a) is fed via a portion of its anode resistor and a wire 48 to both arms of stage 2 and also to the grid of only tube (b) of stage 8. Each time stage 2 is tripped off, it produces a negative pulse on the anode of its tube (a) which is fed via a portion of its anode resistor to the two arms of stage 4 to reverse it in either direction. When stage 4 is tripped off, it develops a negative pulse on the anode of its tube (a) which is fed via a portion of its anode resistor to the grid of only tube (a) of stage 8. When stage 8 is turned off, it produces a negative pulse on the anode of its tube (a) which is applied via a portion of its anode resistor to the output line 42 of the order. Before describing operation of the order in registering values, it is mentioned that the value standing in the order is equal to the sum of the designations of the on stages.

Assuming the order is at zero, all four stages are off and tube X is nonconductive. One entry pulse, coming from wire 41, turns on stage 1, and the order stands at 1. A second entry pulse trips stage 1 off which, in turn, trips stage 2 on. The order now stands at 2. A third entry pulse turns on stage 1, and the order now stands at 3 (stages 1 and 2 on). A fourth entry pulse switches off stage 1, which, in turn, trips stage 2 off. As stage 2 trips off, it reverses stage 4 to on state. The order now stands at 4. A fifth entry pulse turns on stage 1, and the order stands at 5 (stages 1 and 4 on). A sixth entry pulse turns off stage 1, causing stage 2 to go on. The order now stands at 6 (stages 2 and 4 on). A seventh entry pulse turns on stage 1, and the order stands at 7 (stages 1, 2, and 4 on). An eighth entry pulse turns off stage 1, causing stage 2 to go off and, as stage 2 goes off, it turns off stage 4. When stage 4 turns off, it produces a negative pulse which is impressed on the grid of only tube (a) of stage 8, with the effect of tripping stage 8 to on status. The order now stands at 8 since only stage 8 is on. When stage 8 is on, the anode of its tube (a) is at high potential. This potential is applied via the shown upper part of voltage divider 46 and via the resistor 45 to the grid of triode X, raising the grid above cut-off potential. Accordingly, tube X becomes conductive. A ninth entry pulse turns on stage 1, and the order stands at 9 (stages 1 and 8 on). A tenth entry pulse turns off stage 1 which thereupon applies a negative pulse to wire 48. This negative pulse is impressed on both arms of stage 2, which is now in off status, and tends to trip it on. Such action of stage 2 demands a rise in potential of the anode of its tube (a) and an attendant rise in grid potential of its tube (b). But tube X is now conductive and overcomes the attempted rise in potential of the anode of tube (a) of stage 2 and of the grid of tube (b). In short, tube X, being in conductive status, blocks stage 2 from triggering to on status. The negative pulse produced by stage 1 is also applied by wire 48 to the tube (b) of stage 8 to trip it off, in consequence of which the anode of its tube (a) drops abruptly to a low potential. This low potential, applied via the resistance coupling between the anode of tube (a) of stage 8 and the grid of triode X will render the triode nonconducting, thus releasing stage 2. If this occurred too soon, the tripping pulse produced by stage 1 might still be effective to turn on stage 2, an action which is to be avoided at this time. To insure against this, the blocking of triode X and its release of stage 2 is delayed until the tripping pulse now being applied to stages 2 and 8 has been spent. It is for this reason that the anode of tube (b) of stage 8 is coupled by capacitor 47 to the grid resistor 45 of triode X. During the reversal of stage 8 to off status, the potential on the anode of tube (b) of this stage is rising rapidly while that on the anode of tube (a) is dropping. The rising potential on the anode of tube (b) of stage 8 is transmitted via capacitor 47 to grid resistor 45 of triode X and counteracts the effect of the declining potential fed to this grid resistor from the anode of tube (b) of stage 8 until capacitor 47 becomes charged. Thus, the grid of triode X does not follow the anode of tube (a) of stage 8 immediately, but is held above cut-off potential for a finite delay period; i. e., until capacitor 47 becomes charged. Thereafter, the low potential existing on the anode of tube (a) of stage 8, as long as this stage remains off, is effective to maintain triode X nonconductive.

It is clear now that the tenth entry pulse causes stages 1 and 8 to trip off while stage 2 is prevented from turning on. Since stage 4 also is off, the register order again stands at zero. The eighth stage in tripping to off position causes a negative pulse to be applied to the output line 42 which is connected to the input of the tens order.

The use of relay points R4A and R4B has been explained in connection with the entry of the elusive one into the counter. Closure of the R4C (Fig. 14) points cause the energization of relay R5. The R5A points close to complete a circuit in series with the normally closed R6A points which shunts resistor 17 and thus causes the motor to run at high speed. The R5B points close to complete a circuit through the clutch magnet 16 thus causing the sprocket shaft to rotate and film to be fed.

As the linear distance on the film between the trailer splice and the stop notch should be approximately three feet, the leader set-up switches should have the number 65 set up in them, which means that the film sprocket would feed 65 frames or 3.05 feet, after which the feeding stops and the stop notch is punched in the film. The tens complement of the number 65 (or 9935) would therefore be entered in the electronic counter in a manner before explained. As the commutator shaft makes one revolution per film frame, the commutator C4 provides an impulse for each frame and causes a 1 to be added in the electronic counter for each frame. When 55 frames have been counted the number in the counter will be 9990. As both the tens and hundreds orders are at 9, stage number 1 and stage number 8 of these orders are at their on status which means that the left-hand triodes in these stages are conducting and the right-hand triodes are at cut-off. It will be noted that the grids of the right-hand triodes of these stages are connected respectively to the grids of triodes 50, 51, 52, and 53 (Fig. 11), thus holding these triodes at cut-off, and consequently there is no current flow through the resistor 54. With no current flow through resistor 54, the grid of triode 56 is subjected to a voltage from a voltage divider 55 sufficient to permit the triode 56 to conduct and thus energize a relay coil R6. It should be mentioned that if any one or all of the triodes 50, 51, 52, and 53 are conducting, there is sufficient current flowing through resistor 54 to cause lowering of the grid potential of triode 56 to cut-off. The triodes 50, 51, 52, 53, 56, and their associated resistors comprise a means to detect the presence of nines in both the tens and the hundreds orders. The condition of nines in the tens and hundreds orders occurs ten counts before the counter goes to zero.

The energization of the relay coil R6 causes the opening of contacts R6A (Fig. 14) and the closure of contacts R6B. The opening of the R6A points interrupts the shunt circuit around resistor 17 and causes the motor to drop back to low speed. The closure of the R6B points completes a holding circuit through the R6 holding coil and the now closed R5B points, thus keeping relay R6 energized. Since the R5B points are closed, the clutch magnet 16 remains energized so that the film continues to be fed but at a slower speed. When the 65 frames have been counted, the counter will be at zero. As the counter reaches zero, the right-hand triodes in all stages are conducting, and the left-hand triodes in all stages are at cut-off. The left-hand triode in each stage controls one of the triodes 60 to 75 (Fig. 11), inclusive, and consequently, when the counter is at zero, all triodes 60 to 75, inclusive, are at cut-off and no current flows through resistor 76. With no current flowing through resistor 76, the grid of triode 77 is subjected to a voltage from a voltage divider 78 sufficient to cause triode 77 to conduct and energize relay coil R7. If any one or all of triodes 60 to 75, inclusive, are conducting, there is sufficient current flow through resistor 76 to lower the potential of the grid of triode 77 to cut-off.

Energization of relay R7 causes the closure of the R7A points (Fig. 14) and the subsequent energization of relay coil R8 through the now closed R1C point when contacts on the commutator C1 close. The energization of relay coil R8 causes the opening of points R8A and the closure of points R8B, R8C, and R8D. The opening of point R8A destroys the holding circuit for the relay R1 which becomes deenergized. The closure of point R8B provides a holding circuit for relay R8 through the then closed R9D points and commutator C2. The closure of the R8C points provides a potential circuit through the nontransferred R12B points to the stop notch solenoid 174 which will be completed when the contacts of the commutator C3 close. The action of the R8D points will be explained later.

The deenergization of relay coil R1 causes the deenergization of relay coil R2 due to the opening of contacts R1B, and the deenergization of relay coil R2 causes the deenergization of relay coil R3 due to the opening of relay points R2A. It will be noted that the R2B points (Fig. 13) in transferring back to their normal position cancel any entry in the electronic counter, but this is ineffective at this time as the counter was standing at zero before relay coil R2 was deenergized. The opening of contacts R3A drops out the complement relays which were energized through the leader set-up switches and also relays R13, R14, R15, and R16. The complement relays RU1, 2, 4, 8, etc. when deenergized, cause their associated transfer points which are in the grid returns of the left-hand triode in each counter stage to return to normal position, and in so doing, they again enter the nines complement of the number in the leader set-up switches. This operation is not desired but does no harm as the counter is again canceled, as will be explained later. Relay coil R7 becomes deenergized due to this counter entry. The deenergization of relays R13, R14, R15, and R16 cause the opening of their A points and subsequent deenergization of relay R4. The deenergization of relay R4 causes the closure of the R4A points (Fig. 9) and the opening of the R4B and R4C points. The closing of the R4A points and the opening of the R4B points causes an elusive one to be entered in to the counter which is unwanted but does not harm at this time since, as mentioned above, the counter is later canceled. The opening of the R4C points causes the deenergization of relay coil R5, which causes the opening of points R5A and R5B. The opening of the R5A points is the main factor in maintaining the slow speed circuit to the motor 104 as the R6A points close as soon as relay hold coil R6 is deenergized due to the opening of the contacts R5B. The opening of the R5B points also causes deenergization of the clutch magnet 16, and thus the machine latches up at the end of the cycle in which the electronic counter goes to zero.

The contacts of commutator C3 close after the clutch magnet latches up and completes a circuit through the stop notch solenoid 174 causing it to perforate the film. At the end of the punching stroke the contacts 157A close energizing relay pick up coil R9. The energization of relay coil R9 causes the closure of contacts R9A, R9B, R9C, and the opening of contacts R9D. The closure of the R9A points provides a holding circuit for relay R9 through the now closed R10A points and the R9 holding coil. The closure of contacts R9B sets up a circuit which will be used later to energize relay R10, while the closure of the R9C points energizes the relay coil R2. The opening of the R9D contacts destroys the holding circuit for relay coil R8 which becomes deenergized. This causes the R8A points to close, but no energizing of R1 takes place since the R1A points are open. The R8B points open in the holding circuit of the relay coil R8, and the R8C points open to deenergize the stop notch solenoid 174.

The mechanism is now effectively under control of relay R9. Energization of relay R2, in addition to resetting the counter to zero, also energizes relay R3 which enters in the counter the nines complement of the number in the "No. of Frames Set Up Switches" 92A through 92D. The circuit extending from the line 11 through the R3A points was shifted to the latter switches by points R9E which by now are in the energized position. This operation picks up relay R4 through R13A, R14A, R15A, and R16A, causing the elusive one to be entered in the counter, and relay R4 in turn picks up R5 which energizes the clutch magnet and causes the motor to run at high speed. The mechanism continues to run, counting each frame, and when the counter goes to a number which is ten counts from zero, nines again appear in the tens and hundreds orders causing relay R6 to become energized and effect a slowing down of the motor during the last ten counts. When the counter goes to zero, the relay R7 energizes, the R7A points close and allow a circuit to be completed through the R10 relay coil when commutator C1 makes. Relay coil R10 holds through the R10C points, the now closed R11A points and commutator C2. The R10A points open to drop out relay R9. The R9C points opening drop out relay R2, the R2A points opening drop out R3, and the R3A points opening drop out relays R13, R14, R15, and R16. The A points of these relays open and drop out relay R4, and the R4C points opening drop out relay R5. The events which take place when relays R2, R3, R4, and R5 are deenergized have been described in detail above.

The clutch magnet 16 and relay R6 become deenergized because of the now open R5B points, and the clutch latches up. When the contacts of commutator C3 close, a circuit is completed through it and the now closed R10B points to energize the start notch solenoid 173, and thus again perforate the film. Near the end of the punch stroke, the contacts 156A close and energize relay coil R11. The contacts R11A open and destroy the holding circuit for relay coil R10, and the R10B points in opening deenergize the start notch solenoid 173.

The operator then splices the black leader which should be about 5 feet long to film at a distance of approximately 3 feet from the start notch. The advance button 13 (Fig. 15) is then depressed and is held depressed until the splice is about to go over the film sprocket at which time it is released. The threading hole button 14 is now depressed, energizing relay coil R17. The energization of relay coil R17 causes the closure of the R17A points and the R17B points. The R17A points in closing energize relay coil R1, and the R17B points energize relay coil R12. Relay coil R1 holds through the R1A points and the normally closed R8A contacts. The operation of the machine after depression of the threading hole button 14 is similar to the operation of the machine after depression of the notch button 18, i. e., the number of frames set in the leader set-up switches 91A through 91D will be counted off before the film is perforated. When the machine latches up at the end of the cycle in which the counter goes to zero, a circuit is completed through the contacts of commutator C3, the closed R8C points, the shifted R12B points and the threading hole solenoid 175 to punch a threading hole in the film. Near the end of the punch stroke, the threading hole solenoid contacts 158A close and energize relay coil R18. The R18B points open to deenergize relay coil R8. The R8C points open to break the circuit to the threading hole solenoid 175 while the R8D points open to break the holding circuit for relay coil R12. The R8D points are in parallel with the R18A points to insure that the drop out of relay R12 is delayed until after the drop out of relay R8. Thus there is no chance of the R12B points shifting back to normal position before the R8C points are open. This prevents an unwanted circuit to the stop notch solenoid 174.

The film which has now been prepared for card to film operation has, in sequence, two feet of black leader to the threading hole; three feet of black leader from the threading hole to the forward splice; three feet of raw film from the forward splice to the start notch; a sufficient length of raw film to photograph the desired number of cards between the start notch and the stop notch; three feet of raw film from the stop notch to the second splice; and a black trailer of three feet.

While there has been shown and described and pointed out the fundamental novel features of the invention as applied to a single modification, that is the preparation of film for use in a film to card machine, it will be understood that various omissions and substitutions and changes in the form and details of the device illustrated and in its operation may be made by those skilled in the arts without departing from the spirit of the invention. It is the intention therefore to be limited only as indicated by the scope of the following claims.

What is claimed is:

1. A machine adapted to perforate film in strip form comprising, in combination, a punching mechanism, feed rolls for feeding a strip of film through said punching mechanism, drive means, a clutch means for coupling said drive means to said feed rolls, said drive means normally rotating said feed rolls at a rapid rate, means including contacts rotating with said feed rolls for emitting an electrical impulse for each unit length of film fed through said punching mechanism, an electronic counter settable to count any desired number of unit lengths fed, means for subjecting said counter to said electrical impulses for effecting counting operations, a first control means operated by said counter as its set number is approached to reduce the speed of said drive means, and a second control means operated by said counter when reaching its set number for disengaging said clutch means to stop said feed rolls, and for energizing said punching mechanism to perforate the film.

2. A machine adapted to perforate film in strip form comprising, in combination, first and second punching mechanisms, feed rolls for feeding a strip of film through said punching mechanisms, drive means, a clutch means for coupling said drive means to said feed rolls, said drive means normally operating to rotate said feed rolls at a rapid rate, means including contacts rotating with said feed rolls for emitting an electrical impulse for each unit length of film fed through said punching mechanism, an electronic counter adapted to perform counting operations in response to electric impulses, means including a first set-up switch settable to determine the number of counting operations that can be performed by said counter, said last mentioned means operating in response to each impulse from said impulse emitting means for subjecting said counter to an electric impulse, a first control means operated by said counter as the counter approaches the number determined by said first set-up switch for reducing the speed of said drive means, a second control means operated by said counter when the count determined by said first set-up switch is reached for disengaging said clutch means to stop said feed rolls and for energizing said first punching mechanism to perforate the film, means including a second set-up switch settable to determine the number of counting operations that can be performed by said counter, means including contacts closed by said first punching mechanism at the completion of the perforation for connecting said second set-up switch to determine the operations of said electronic counter, means operable upon connection of said second set-up switch for effecting an operation of said drive means at a rapid rate and an engagement of said clutch to drive said feed rolls, means operated by said counter as the count approaches the number of operations determined by said second set-up switch for reducing the speed of said drive means, and control means operated by said counter when the count determined by said second set-up switch is reached for disengaging said clutch means to stop said feed rolls and energizing said second punching mechanism to perforate the film.

3. A machine adapted to perforate tape comprising, in combination, a punching mechanism, feeding means for feeding tape through said punching mechanism, drive means for driving said feeding means at a rapid rate, means connected to said drive means for emitting an impulse for each unit length of tape fed, an electronic counter including a plurality of pairs of electron tubes, the tubes of one pair being connected in a trigger circuit so that one tube of the trigger pair is conducting at one time and the other tube is non-conducting at the same time, the tubes having outputs indicative of their conducting or non-conducting condition, said counter settable to count any desired number and operable in response to impulses received from said impulse emitting means for performing counting operations, the tubes of said counter being conditioned to assume, in combination, a first conduction and non-conduction pattern as the counter approaches the desired number and a second conduction and non-conduction pattern as the counter reaches the desired number, control means responsive to a coincidence of certain outputs from tubes of said counter as the counter approaches the set number and assumes said first conduction and non-conduction pattern, for reducing the speed of said drive means, and thereafter responsive to a coincidence of other outputs from the tubes, as the counter reaches the desired number and assumes the second conduction and non-conduction pattern, for stopping said drive means and operating the punching mechanism to perforate the tape.

4. A machine adapted to perforate film in strip form comprising, in combination, a punching mechanism, feed rolls for feeding a strip of film through said punching mechanism, drive means, a clutch means for coupling said drive means to said feed rolls, said drive means normally rotating said feed rolls at a rapid rate, means including contacts rotating with said feed rolls for emitting an electrical impulse for each unit length of film fed through said punching mechanism, an electronic counter including a plurality of pairs of electron tubes, the tubes of one pair being connected in a trigger circuit so that one tube of the trigger pair is conducting at one time and the other tube is non-conducting at the same time, the tubes having outputs indicative of their conducting or non-conducting condition, said counter settable to count any desired number, means for subjecting said counter to said electrical impulses for effecting counting operations, the tubes of said counter being conditioned to assume, in combination, a first conduction and non-conduction pattern as the counter approaches the desired number, and a second conduction and non-conduction pattern as the counter reaches the desired number, control means responsive to a coincidence of certain outputs from tubes of said counter, as the counter approaches the set number and assumes said first conduction and non-conduction pattern, for reducing the speed of said drive means, and thereafter responsive to a coincidence of other outputs from the tubes of said counter, as the counter reaches the desired number and assumes the second conduction and non-conduction pattern, for disengaging said clutch means to stop said feed rolls, and for energizing said punching mechanism to perforate the film.

References Cited in the file of this patent

UNITED STATES PATENTS

| Number | Name | Date |
|--------|------|------|
| 497,566 | Clarke | May 16, 1893 |
| 699,611 | Benner | May 6, 1902 |
| 854,706 | Eden | May 21, 1907 |
| 1,421,354 | Littell | June 27, 1922 |
| 1,789,688 | Rast et al. | Jan. 20, 1931 |
| 1,945,218 | Fishburn et al. | Jan. 30, 1934 |
| 1,996,665 | Walker | Apr. 2, 1935 |
| 2,091,724 | Wistler | Aug. 31, 1937 |
| 2,338,596 | Pitt et al. | Jan. 4, 1944 |
| 2,379,682 | Colucci et al. | July 3, 1945 |
| 2,519,184 | Crosdoff | Aug. 15, 1950 |
| 2,610,793 | Krause | Sept. 16, 1952 |